R. L. GREENLEAF.
HEEL TRIMMER.
APPLICATION FILED JAN. 2, 1913.

1,078,849.

Patented Nov. 18, 1913.

Witnesses

Inventor
R. L. Greenleaf.
By
Attorneys.

UNITED STATES PATENT OFFICE.

RUPERT L. GREENLEAF, OF BROCKTON, MASSACHUSETTS, ASSIGNOR OF ONE-HALF TO FRANK A. CARLSON, OF BROCKTON, MASSACHUSETTS.

HEEL-TRIMMER.

1,078,849.   Specification of Letters Patent.   Patented Nov. 18, 1913.

Application filed January 2, 1913. Serial No. 739,842.

*To all whom it may concern:*

Be it known that I, RUPERT L. GREENLEAF, citizen of the United States, residing at Brockton, in the county of Plymouth and State of Massachusetts, have invented certain new and useful Improvements in Heel-Trimmers, of which the following is a specification.

This invention relates to heel trimmers, and has special reference to the lip or rand cutter.

One object of the invention is to provide a rand cutter of such form that a space will be provided for the escape of the shavings or cuttings and fine dust so that the cutter will not become clogged while in use, and a further object of the invention is to provide a cutter which will not need frequent grinding in order to retain a proper cutting edge.

Other objects of the invention will incidentally appear as the description of the same proceeds.

The invention is illustrated in the accompanying drawings and consists in certain novel features which will be particularly pointed out in the claim following the description.

Figure 1:
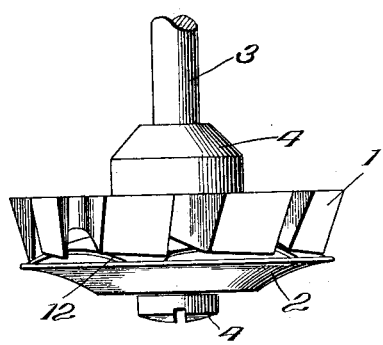
Figure 3:
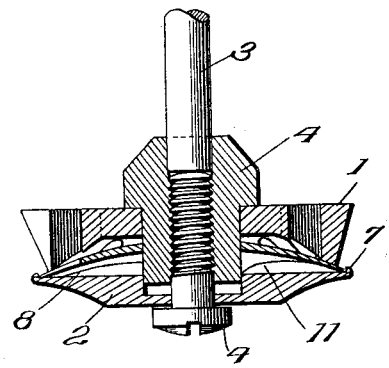
Figure 2:
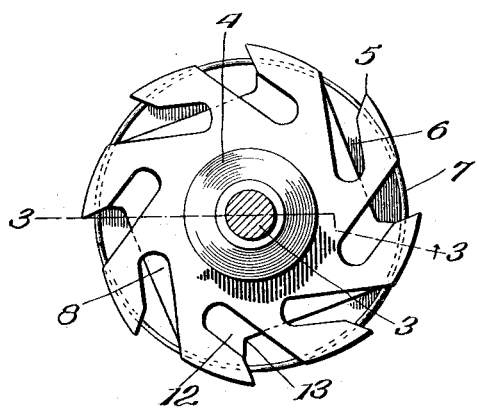
Figure 4:
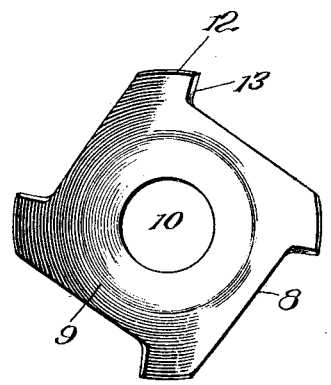

In the drawings: Figure 1 is an elevation of a cutter embodying my present invention; Fig. 2 is a top plan view of the same; Fig. 3 is a transverse section taken on the line 3—3 of Fig. 2; Fig. 4 is a bottom plan view of the lip or rand cutter.

The heel or sole edge cutter 1 and the shield 2, of the usual formation, are secured to the end of the arbor or shaft 3 by a screw or bolt 4 in the usual manner. The cutter 1 is constructed with a plurality of cutting teeth or edges 5 between which are spaces or slots 6 disposed at an angle to the radius of the cutter to permit the shavings and fine dust to pass to the interior of the cutter, as will be readily understood on reference to Fig. 3. The shield 2 is constructed with an annular flange 7 at its edge on its upper face, and the rand cutter 8 engages under the said flange, as will be readily understood on reference to Fig. 3. The rand cutter consists of a resilient plate 9 having a central opening 10 to fit around the end of the shaft 3 or the collar thereon, and the plate is dished as shown clearly in Fig. 3 so that a space 11 will be provided between the cutter and the shield. The cutter is provided at its edge with spaced teeth or spurs 12, the outer edges of which are adapted to engage under the flange 7 of the shield whereby the cutter will be held in proper relation to the shield.

The forward edge 13 of each tooth or spur is under-cut or beveled so as to furnish a cutting edge approximately radial to the cutter which will engage the rand or the upper side of the edge of the heel or sole and trim away the same in the operation of the device. The outer edge of the cutter 1 bears upon the spurs 12 of the rand cutter and the under side of the cutting teeth 5 of the trimming cutter 1 bear upon the upper face of the rand cutter so that when the bolt 4 is turned home the two cutters will be firmly clamped to the shield, spaces being provided, however, between the rand cutter and the face of the shield and between the two cutters through which the fine dust and shavings created by the cutting of the leather will readily escape so that the cutters cannot become clogged.

By referring more particularly to Figs. 2 and 4, it will be noted that a considerable space is left between successive teeth or spurs of the rand cutter and that a space will be provided between the edge of said cutter and the edge of the shield between successive teeth so that the shavings and fine dust cannot collect between the teeth but will be drawn under the rand cutter and be thrown out at the back thereof through the centrifugal draft created by the rotation of the cutter. It will also be noted that a rather long cutting edge is provided on each spur or tooth of the rand cutter so that they will not be quickly worn down, and they are disposed at such an angle to the cutting teeth 5 on the heel trimming cutter that they make a draw cut across the rand or the edge of the heel and will consequently operate very easily and smoothly. It will be noted that the outer edges of the spurs or teeth are curved on arcs similar to the curve described by the flange 7 of the shield so that the cutter will rest firmly against the said flange and against the face of the shield and will consequently be easily held in place and will not slip while in use.

The security of the rand cutter is enhanced by the resiliency of the same, as it springs firmly against the shoulder on the edge of the shield when the securing bolt is driven home.

As an ample clearance is provided between the cutter and the face of the shield, the dust cannot collect upon the cutter and clog the same and cause burning of the shoe. The cutting edge of the rand cutter is so disposed that the raw edge of the sole or heel comes in contact only with the sharp edge of the cutter so that splitting of the rand will not occur. While the cutter has a firm bearing upon the shield, the contacting surfaces are very slight so that wear upon the shield is very slight and only a sharp cutting edge comes in contact with the sole or heel.

Having thus described my invention, what I claim is:

The combination with a shield, and an edge cutter, of a rand cutter interposed between the said edge cutter and the shield and having spaced spurs bearing against the shield, the edge of the rand cutter between the said spurs being spaced from the edge of the shield, and the lower face of the rand cutter being concave to provide a clearance space between the same and the shield and means for clamping the rand cutter between the shield and the edge cutter.

In testimony whereof I affix my signature in presence of two witnesses.

RUPERT L. GREENLEAF. [L. S.]

Witnesses:
NESHAN ROOBENIAN,
ALFRED J. SENECAL.

Copies of this patent may be obtained for five cents each, by addressing the "Commissioner of Patents, Washington, D. C."